United States Patent
Kiebre et al.

(10) Patent No.: US 10,814,673 B2
(45) Date of Patent: Oct. 27, 2020

(54) PROTECTIVE CROWN REINFORCEMENT FOR AEROPLANE TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Rimyalegdo Kiebre, Clermont-Ferrand (FR); Olivier Francois, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 597 days.

(21) Appl. No.: 15/534,384

(22) PCT Filed: Dec. 2, 2015

(86) PCT No.: PCT/EP2015/078369
§ 371 (c)(1),
(2) Date: Jun. 8, 2017

(87) PCT Pub. No.: WO2016/091685
PCT Pub. Date: Jun. 16, 2016

(65) Prior Publication Data
US 2017/0361656 A1     Dec. 21, 2017

(30) Foreign Application Priority Data
Dec. 8, 2014   (FR) .................................. 14 62038

(51) Int. Cl.
 *B60C 9/18*   (2006.01)
 *B60C 9/26*   (2006.01)
 *B60C 9/20*   (2006.01)

(52) U.S. Cl.
 CPC .......... *B60C 9/1807* (2013.01); *B60C 9/2009* (2013.01); *B60C 9/263* (2013.01); *B60C 2009/2025* (2013.01); *B60C 2009/2067* (2013.01); *B60C 2200/02* (2013.01)

(58) Field of Classification Search
 CPC .......... B60C 9/18; B60C 9/1807; B60C 9/20; B60C 209/2012; B60C 209/2032
 See application file for complete search history.

(56) References Cited

U.S. PATENT DOCUMENTS

| | | | |
|---|---|---|---|
| 3,770,042 A | 11/1973 | Greene et al. | |
| 4,523,619 A * | 6/1985 | Gouttebessis | B60C 9/0042 139/408 |
| 5,730,814 A | 3/1998 | Morikawa et al. | |

FOREIGN PATENT DOCUMENTS

| | | |
|---|---|---|
| EP | 0 540 303 | 5/1993 |
| FR | 2 984 231 | 6/2013 |
| WO | WO 88/03481 | 5/1988 |

* cited by examiner

*Primary Examiner* — Justin R Fischer
(74) *Attorney, Agent, or Firm* — Cozen O'Connor

(57) ABSTRACT

Protective reinforcement (3) for a tire has a mean radial thickness T at least equal to two times the diameter D of a-12-einforce (4), comprises respectively on its radially interior face (31) and on its radially exterior face (32) parts (7) made of elastomeric compound having an axial width W at least equal to the diameter D of a-12-reinforcer (4), and the path of any-12-reinforce (4), in the circumferential direction (XX'), varies radially between the radially interior first face (31) and the radially exterior second face (32), in such a way that the set of paths of the reinforcers (4) of the protective reinforcement (3) constitutes a three-dimensional lattice. Furthermore, the path of any-12-reinforce (4), in the circumferential direction (XX'), is a zigzag curve extending axially over the entire axial width L of the protective reinforcement (3).

14 Claims, 3 Drawing Sheets

PROTECTIVE CROWN REINFORCEMENT FOR AEROPLANE TIRE

RELATED APPLICATIONS

This is a U.S. National Phase Application under 35 USC 371 of International Application PCT/EP2015/0789369 filed on Dec. 2, 2015.

This application claims the priority of French application no. 1462038 filed Dec. 8, 2014, the entire content of which is hereby incorporated by reference.

FIELD OF THE INVENTION

The present invention relates to an aircraft tire and, in particular, to the protective reinforcement of an aircraft tire.

BACKGROUND OF THE INVENTION

In general, since a tire has a geometry exhibiting symmetry of revolution with respect to an axis of rotation, the geometry of the tire is generally described in a meridian or radial plane containing the axis of rotation of the tire. For a given meridian plane, the radial, axial and circumferential directions respectively denote the directions perpendicular to the axis of rotation of the tire, parallel to the axis of rotation of the tire and perpendicular to the meridian plane.

In what follows, the expressions "radially", "axially" and "circumferentially" respectively mean "in the radial direction", "in the axial direction" and "in the circumferential direction" of the tire. The expressions "radially on the inside of and, respectively, radially on the outside of" mean "closer to and, respectively, further away from, the axis of rotation of the tire, in the radial direction, than". The expressions "axially interior, and, respectively, axially exterior" mean "closer to and, respectively, further away from, the equatorial plane of the tire, in the axial direction, than", the equatorial plane of the tire being the plane perpendicular to the axis of rotation of the tire passing through the middle of the tread of the tire.

The protective reinforcement of the tire is a cylindrical structure having as its axis of revolution the axis of rotation of the tire. The protective reinforcement extends axially from a first axial end as far as a second axial end over an axial width L and extends radially from a radially interior first face as far as a radially exterior second face over a mean radial thickness T. In the radial direction, the protective reinforcement is a stack of at least one protective layer made up of reinforcing elements or reinforcers that are metal or textile. The reinforcers are coated in an elastomeric compound, namely in a material based on natural or synthetic rubber obtained by blending various constituents. When the protective reinforcement is made up of a stack of at least two protective layers, the axial width L of the protective reinforcement is the axial width of the protective layer of greatest axial width, and the mean radial thickness T of the protective reinforcement is the sum of the mean radial thicknesses of the protective layers. The protective reinforcement is radially on the inside of a tread and radially on the outside of a working reinforcement. The protective reinforcement essentially protects the working reinforcement from attack likely to spread through the tread radially towards the inside of the tire.

The tread is the part of the tire that is intended to come into contact with the ground via a radially exterior tread surface: this is the wearing part of the tire. In the case of an aircraft tire, the tread, comprising at least one elastomeric compound, is usually made up of circumferential ribs separated by circumferential voids known as circumferential grooves.

The working reinforcement, radially on the inside of the protective reinforcement, is also a cylindrical structure having as axis of revolution the axis of rotation of the tire. In the radial direction, the working reinforcement is a stack of at least two working layers usually made up of textile reinforcers coated in an elastomeric compound. In an aircraft tire, the reinforcers of a working layer generally follow, in the circumferential direction of the tire, a periodic zigzag path the amplitude of which defines the axial width of the working layer. The working reinforcement governs the mechanical behaviour of the crown of the tire. The assembly made up of the working reinforcement and the protective reinforcement constitutes the crown reinforcement.

According to current aircraft tire designs, the protective reinforcement is often made up of a single protective layer. The protective layer comprises either metal reinforcements following a wavy path in the circumferential direction of the tire or textile reinforcers having a wavy path in the circumferential direction of the tire or making an angle with the circumferential direction of the tire.

In the case of a protective layer with metal reinforcers following a wavy path in the circumferential direction of the tire, the mass of the protective reinforcement is relatively high given the mass of the metal reinforcers, and this is penalizing in terms of the mass of the tire and therefore of the payload carried by the aircraft.

Whether the protective layer comprises metal reinforcers following a wavy path or textile reinforcers following a wavy path or lying at an angle, it has been found that the protective reinforcement can sometimes be insufficient to prevent the migration of foreign objects from the tread to the working reinforcement, in other words that it may be insufficiently resistant to foreign object damage (FOD). Specifically, given the harsh conditions in which it is used, these being characterized by a high inflation pressure, a high static load and a high speed, an aircraft tire is particularly sensitive to any attack on its tread by a piercing foreign object, which may be present by chance on the runway. In the event of such an attack on the tread, the piercing foreign object, having passed through the protective reinforcement, can progress towards the working reinforcement. If the working reinforcement is completely pierced, this may result in a slow loss of pressure and general damage to the structure of the tire. If the working reinforcement is partially pierced, the retreadability of the tire, namely its ability to have its tread replaced after it has worn away, can no longer be guaranteed.

SUMMARY OF THE INVENTION

It is an objective of the present invention to increase the resistance of the protective reinforcement of an aircraft tire to piercing and cutting by foreign objects that have passed through the tread of the tire, namely to improve the resistance of the protective reinforcement to foreign object damage.

This objective is achieved by one aspect of the invention directed to an aircraft tire comprising:

a tread, intended to come into contact with a ground, a protective reinforcement, radially on the inside of the tread, the protective reinforcement having a cylindrical structure having as its axis of revolution the axis of rotation of the tire, extending axially from a first axial end as far as a second axial end over an axial width L and extending radially from a radially interior first face as far as a radially exterior second face over a mean radial thickness T, the protective reinforcement comprising reinforcers coated in an elastomer compound, having a diameter D and having a path in the circumferential direction of the tire, the protective reinforcement being radially on the outside of a working reinforcement, the working reinforcement comprising at least two radially superposed working layers made up of reinforcers having a zigzag path in the circumferential direction of the tire, the protective reinforcement having a mean radial thickness T at least equal to two times the diameter D of a reinforcer, the protective reinforcement comprising respectively on its radially interior face and on its radially exterior face parts made of elastomeric compound having an axial width W at least equal to the diameter D of a reinforcer, the path of any reinforcer of the protective reinforcement, in the circumferential direction of the tire, varies radially between the radially interior first face and the radially exterior second face, in such a way that the set of paths of the reinforcers of the protective reinforcement constitutes a three-dimensional lattice, the path of any reinforcer of the protective reinforcement, in the circumferential direction of the tire, is a zigzag curve extending axially over the entire axial width L of the protective reinforcement.

This aspect of the invention obtains a protective reinforcement that has both better mechanical connection at its respectively radially interior and exterior faces to the working reinforcement and to the tread, and better resistance to unravelling of the reinforcers of which it is formed in the event of damage to the said protective reinforcement, thanks to the three-dimensional lattice work effect, namely thanks to the effect whereby the reinforcers are interlaced.

According to an embodiment of the invention, the mean radial thickness T of the protective reinforcement is at least equal to two times the diameter D of a reinforcer so as to be able to obtain the three-dimensional lattice effect.

Again according to an embodiment of the invention, the protective reinforcement comprises respectively on its radially interior face and on its radially exterior face parts made of elastomeric compound having an axial width W at least equal to the diameter D of a reinforcer. In other words, at the radially interior and, respectively, radially exterior, face there are parts made of elastomeric compound without any reinforcer. In practice, during manufacture, prior to the tire-curing stage, these parts made of elastomeric compound correspond to interstitial holes between the reinforcers which are then filled with an elastomeric compound at the time of curing of the tire. Thus, on the radially interior and, respectively, exterior face, there is an alternation of parts comprising reinforcers and of parts without reinforcers, the latter parts contributing to more effective connection to the components at the interface with the protective reinforcement, such as the working reinforcement and the tread. In order to be effective, these parts made of elastomeric compound need to have a minimal dimension characterized by a minimal axial width W equal to a reinforce diameter D.

According to an embodiment of the invention, the path of any reinforcer of the protective reinforcement, in the circumferential direction of the tire, varies radially between the radially interior first face and the radially exterior second face, in such a way that the set of paths of the reinforcers of the protective reinforcement constitutes a three-dimensional lattice. In other words, the path of any reinforcer, in the circumferential direction, is not contained in a cylindrical surface having as its axis of revolution the axis of rotation of the tire. In addition, this path may or may not be variable in the axial direction. The result of this is that, in the circumferential direction, any reinforcer is alternately radially on the outside and radially on the inside of at least one other reinforcer. The set of such reinforcers thus constitutes a cylindrical structure having, in its radial thickness, the form of a three-dimensional lattice or interlacing, so that any reinforcer accidentally severed at some point by a foreign object is immobilized by the other reinforcers in contact with it and cannot unravel over the entire circumference. This three-dimensional lattice is therefore a self-locking system that guarantees that the reinforcers cannot become fully circumferentially unravelled.

According to an embodiment of the invention, a path of any reinforcer of the protective reinforcement, in the circumferential direction of the tire, follows a zigzag curve extending axially over the entire axial width L of the protective reinforcement. From the standpoint of the method of manufacturing such a protective reinforcement, the reinforcers are usually laid in groups of reinforcers or strips using a method referred to as a reel-winding method. This reel-winding method, which consists in winding strips, in the circumferential direction of the tire, on a periodic zigzag curve is commonly used for laying the working layers of the working reinforcement of an aircraft tire. In the context of the invention, this reel-winding method is therefore also used for the protective reinforcement. One essential parameter is the period P of the periodic zigzag curve because it makes it possible to regulate the angle formed by the reinforcers with the circumferential direction of the tire. Such a protective reinforcement offers the advantage of being able to be manufactured using a conventional reel-winding method.

Advantageously, the protective reinforcement has a mean radial thickness T at most equal to five times the diameter D of a reinforcer. Upwards of this maximum mean radial thickness T the protection is excessive and the mass of the protective reinforcement becomes too great.

Advantageously again, the axial width W of the parts made of elastomeric compound, comprised respectively on the radially interior face and on the radially exterior face of the protective reinforcement, is at most equal to ten times the diameter D of a reinforcer, preferably at most equal to five times the diameter D of a reinforcer. Upwards of this maximum axial width W there is a risk that the protection will become less effective against the migration of foreign objects through the protective reinforcement.

In any meridian plane, the ratio R, between the sum of the axial widths W of the parts made of elastomeric compound, comprised respectively on the radially interior face and on the radially exterior face of the protective reinforcement, and the axial width L of the protective reinforcement, is at least equal to 0.08, preferably at least equal to 0.10. This ratio characterizes the percentage of reinforcer-free parts with respect to the axial width L of the protective reinforcement. This ratio needs to have a minimal value in order to guarantee sufficient mechanical connection of the protective reinforcement on the one hand to the working reinforcement and on the other hand to the tread.

In any meridian plane, the ratio R, between the sum of the axial widths W of the parts made of elastomeric compound, comprised respectively on the radially interior face and on the radially exterior face of the protective reinforcement, and the axial width L of the protective reinforcement, is at most equal to 0.20, preferably at most equal to 0.15. This ratio needs to be kept at a maximum in order to guarantee that the mechanical connection of the protective reinforcement to the working reinforcement on the one hand and to the tread on the other is not excessively strong.

According to a preferred embodiment, the reinforcers of the protective reinforcement are grouped into strips, comprising at least two consecutive reinforcers. The use of strips of reinforcers comprising, for example and nonexhaustively, at least four reinforcers is commonplace in the field of aircraft tires in order to obtain satisfactory manufacturing productivity.

In the case of a protective reinforcement made up of strips, the axial spacing P1 between two consecutive strips of reinforcers each having a path, in the circumferential direction of the tire, that follows a zigzag curve is at least equal to 0.5 times the axial width B of a strip and at most equal to five times the axial width B of a strip. The axial spacing between two consecutive strips is the name given to the axial distance between their respective opposing axial ends. This spacing needs to be large enough to guarantee that there will be interstitial spaces of elastomeric compound, but not too great, so as not to allow foreign objects to migrate radially towards the inside of the tire.

Advantageously, the path of any reinforcer, in the circumferential direction of the tire, is a periodic zigzag curve having an amplitude A equal to the axial width L of the protective reinforcement and having a period $P=2\Pi R1/K$, K being a non-integer number in the range $]N, N+1[$ where N is an integer at least equal to 0 and at most equal to 9, preferably at most equal to 4, and R1 being the radius of the radially interior first face. Having the amplitude A equal to the axial width L of the protective reinforcement allows the protective reinforcement to be generated in a single hit across its entire width. The period P makes it possible to regulate the angle formed by the said reinforcers with the circumferential direction, typically between 5° and 35°. The fact that K is a non-integer number, namely that the period P is not an integer divisor of the developed placing surface $2\Pi R1$, guarantees that bits of elastomer compound will be present respectively on the radially interior face and on the radially exterior face of the protective reinforcement.

According to a preferred alternative form, the reinforcers of the protective reinforcement are made of at least one textile material. This is because a textile material guarantees a good compromise between the mass and the breaking strength of the reinforcers. The use of textile reinforcers for the protective reinforcement makes a significant contribution to minimizing the mass of the tire, and therefore improving the payload of the aircraft.

The reinforcers of the protective reinforcement are usually made of an aliphatic polyamide or of an aromatic polyamide or of a combination of an aliphatic polyamide and of an aromatic polyamide. Reinforcers made of aromatic polyamide, such as aramid, offer a better compromise between mass and breaking strength than reinforcers made of aliphatic polyamide, such as nylon. Reinforcers made of a combination of an aliphatic polyamide and of an aromatic polyamide, also referred to as hybrid reinforcers, offer both the advantages of an aliphatic polyamide and those of an aromatic polyamide, namely high breaking strength, high tensile strain and low mass.

BRIEF DESCRIPTION OF THE DRAWINGS

The features and other advantages of the invention will be better understood with the aid of the following FIGS. 1 to 4 which have not been drawn to scale.

DETAILED OF THE DRAWINGS

Figure 1:
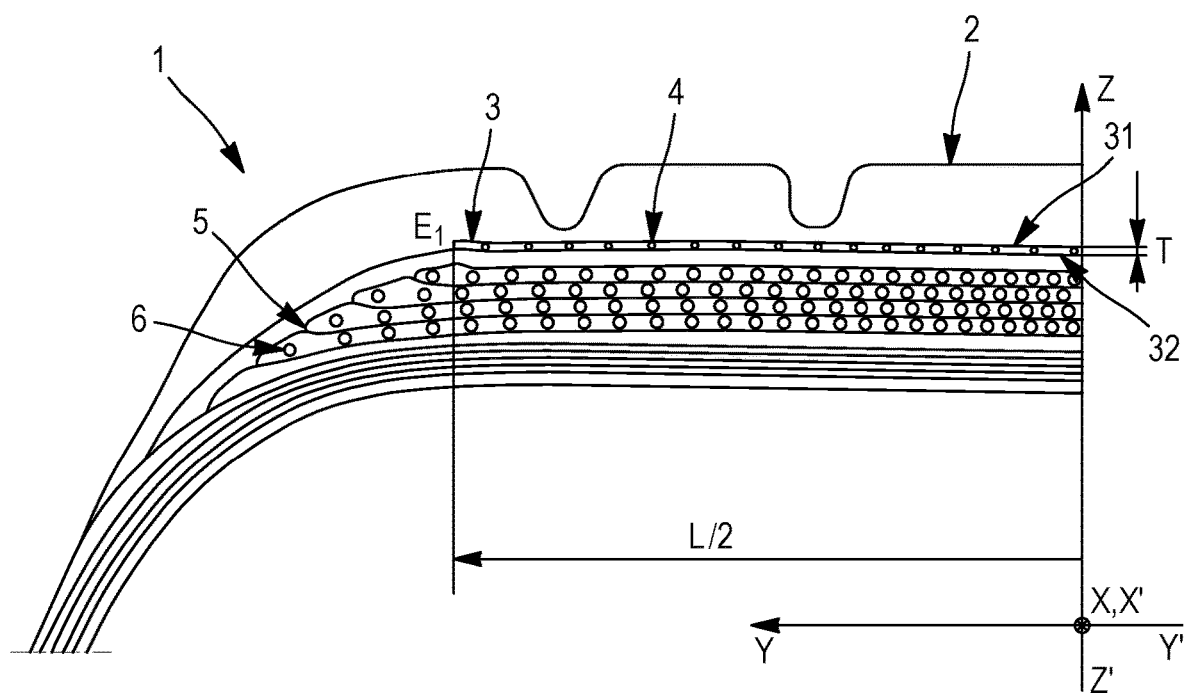
FIG. 1: a half-view in cross section of the crown of an aircraft tire of the prior art, in a radial plane passing through the axis of rotation (YY') of the tire.

FIG. 1 depicts, in a radial plane YZ passing through the axis of rotation YY' of the tire, a half-view in cross section of the crown of an aircraft tire 1 of the prior art, comprising a tread 2 intended to come into contact with a ground and a protective reinforcement 3, radially on the inside of the tread 2. The protective reinforcement 3 is a cylindrical structure having as its axis of revolution the axis of rotation YY' of the tire, extending axially from a first axial end E1 as far as a second axial end E2, symmetric with respect to the equatorial plane XZ (not depicted) over an axial width L and extending radially from a radially interior first face 31 as far as a radially exterior second face 32 over a mean radial thickness T. The protective reinforcement 3 comprises reinforcers 4 coated in an elastomeric compound, having a diameter D and having a path in the circumferential direction XX' of the tire. The protective reinforcement 3 is radially on the outside of a working reinforcement 5 which in this instance comprises four working layers that are radially superposed and made up of reinforcers 6 following a zigzag path in the circumferential direction XX' of the tire (not depicted).

Figure 2:
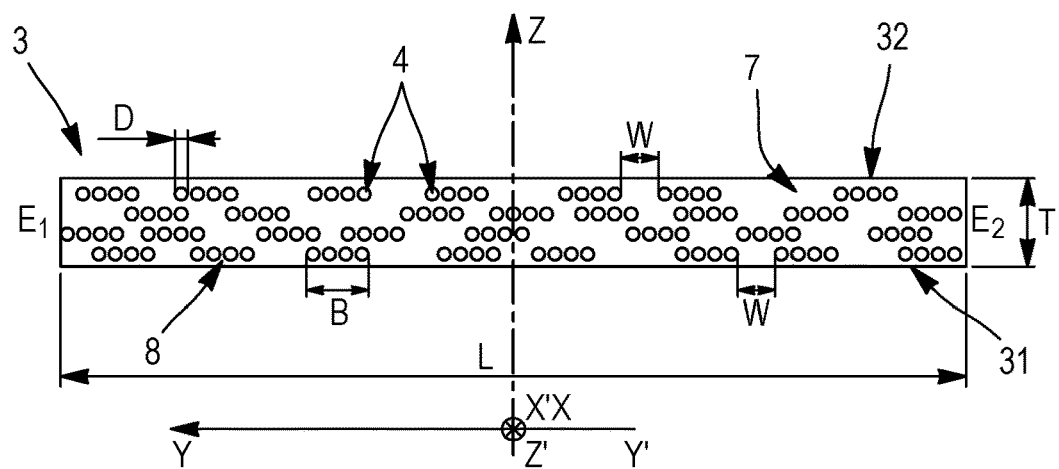
FIG. 2: a meridian section through the protective reinforcement of an aircraft tire according to an embodiment of the invention, in a radial plane (YZ) passing through the axis of rotation (YY') of the tire.

FIG. 2 depicts a meridian section of the protective reinforcement of an aircraft tire according to the invention, in a radial plane YZ passing through the axis of rotation YY' of the tire. The protective reinforcement 3 has a mean radial thickness T at least equal to two times the diameter D of a reinforcer 4, in this instance equal to approximately five times the diameter D of a reinforcer 4. The protective reinforcement 3 respectively comprises, on its radially interior face 31 and on its radially exterior face 32, parts 7 made of elastomeric compound having an axial width W at least equal to the diameter D of a reinforcer 4. This meridian section also shows that the collection of the paths of the reinforcers 4 of the protective reinforcement 3 forms a three-dimensional lattice, resulting from the fact that the path of any reinforcer 4 of the protective reinforcement 3, in the circumferential direction XX' of the tire, varies radially between the radially interior first face 31 and the radially exterior second face 32. Furthermore, the reinforcers 4 of the protective reinforcement 3 are grouped together in strips 8 comprising, in this instance, four consecutive reinforcers 4 and having an axial width B.

Figure 3:
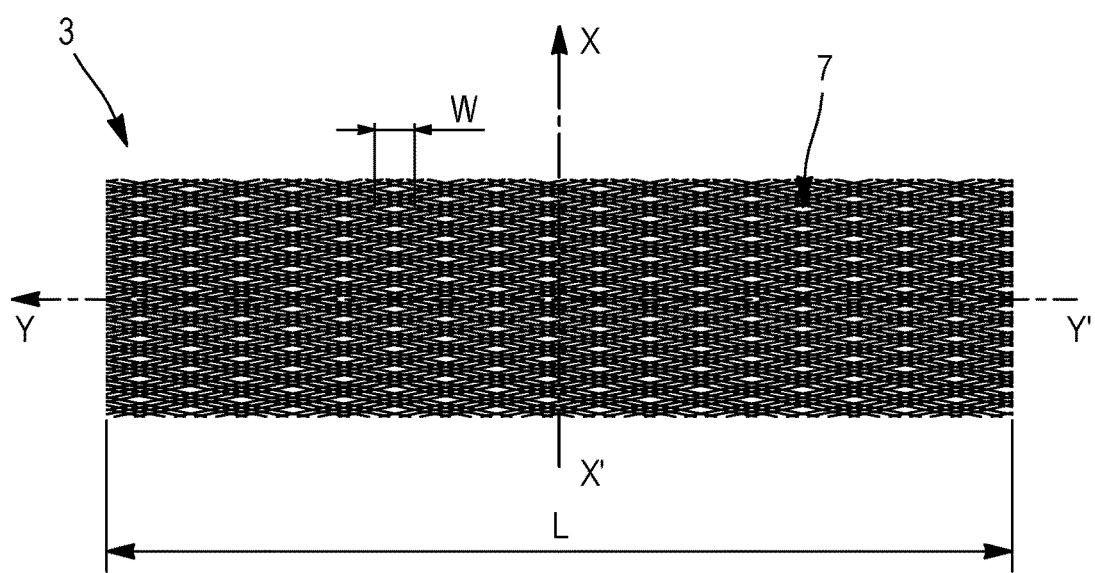
FIG. 3: a view from above of a circumferential portion of the protective reinforcement of an aircraft tire according to an embodiment of the invention.

FIG. 3 depicts a view from above of a circumferential portion of the protective reinforcement of an aircraft tire according to the invention. The protective reinforcement 3 depicted is made up of a three-dimensional lattice of strips of reinforcers extending, in the circumferential direction XX' of the tire, in a zigzag curve. FIG. 3 more particularly shows the bits of elastomer compound 7, free of any reinforcer and having an axial width W, the said bits guaranteeing a strong mechanical bond between the protective reinforcement 3 and the tread and the working reinforcement respectively.

Figure 4:
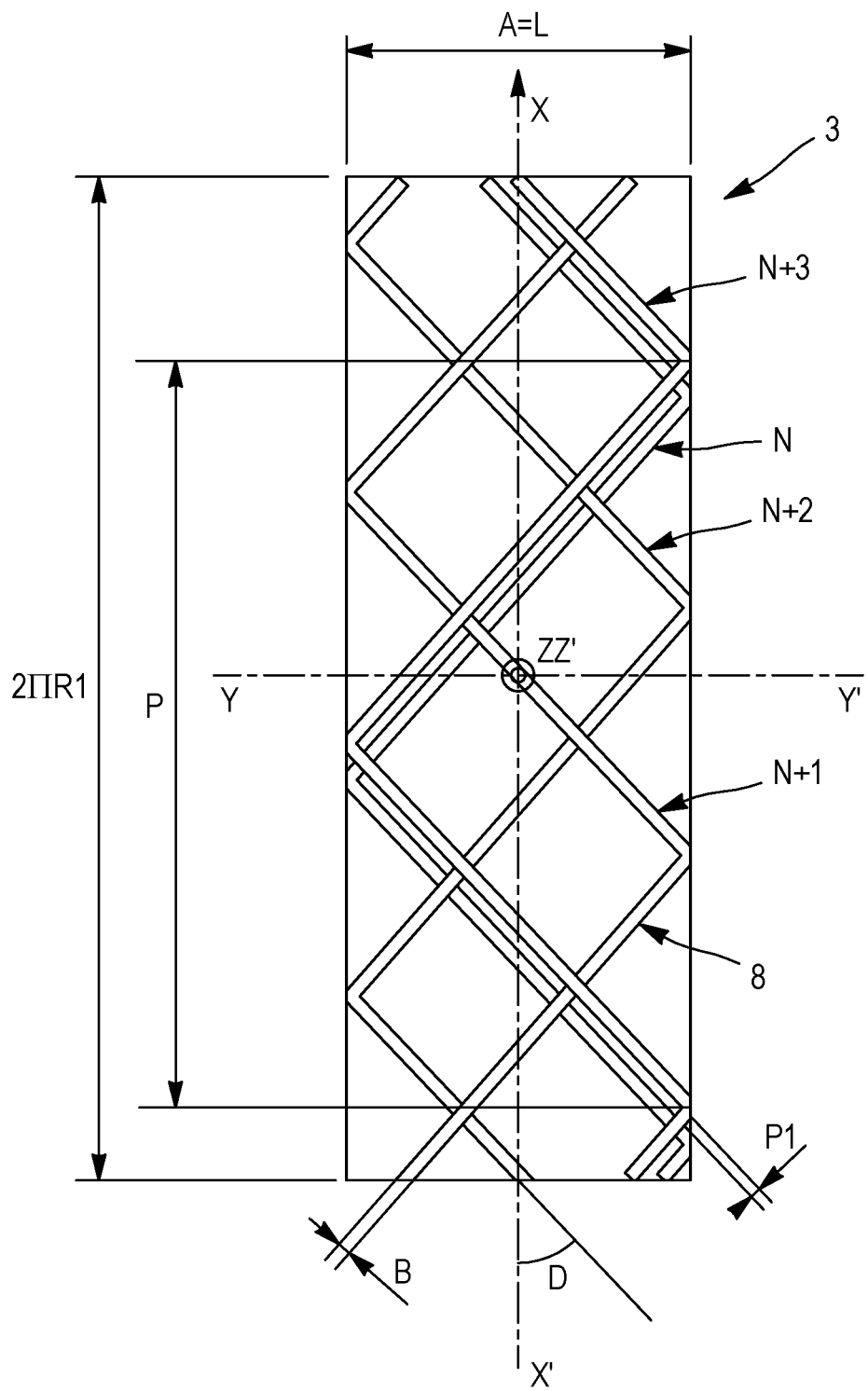
FIG. 4: a view from above of a protective reinforcement of an aircraft tire according to an embodiment of the invention, in the process of being manufactured.

FIG. 4 depicts a view from above of a protective reinforcement of an aircraft tire according to the invention, during the course of manufacture. The protective reinforcement 3 is manufactured according to a reel-winding method which consists in continuously winding, in the circumferential direction (XX') of the tire, a strip 8 made up of reinforcers in a periodic zigzag curve. The periodic curve has an amplitude A equal to the axial width L of the protective reinforcement 3 and a period $P=2\Pi R1/K$, K being a non-integer number in the range ]N, N+1[ where N is an integer at least equal to 0 and at most equal to 9, preferably at most equal to 4, and R1 being the radius of the radially interior first face 31. The strips 8 of width B are spaced apart by a pitch P1. They form with the circumferential direction XX' of the tire an angle D. FIG. 4 depicts the periodic paths corresponding respectively to 4 successive winding turns N, N+1, N+2 and N +3.

The inventors carried out the invention for an aircraft tire of size 46×17 R 20 the protective reinforcement of which was a three-dimensional lattice obtained by a method of laying the protective reinforcement by reel-winding with an axial width L equal to 200 mm and a mean radial thickness T equal to 4 mm. The textile reinforcers of which the protective reinforcement is made are made of nylon and have a diameter D equal to 1 mm. The axial width W of the parts made of elastomeric compound is comprised between 2 mm and 7 mm.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. Aircraft tire comprising:
    a tread, configured to come into contact with a ground;
    a protective reinforcement, radially on an inside of the tread;
    the protective reinforcement having a cylindrical structure having as its axis of revolution an axis of rotation of the tire, extending axially from a first axial end as far as a second axial end over an axial width L and extending radially from a radially interior first face as far as a radially exterior second face over a mean radial thickness T;
    the protective reinforcement comprising reinforcers coated in an elastomer compound, having a diameter D and having a path in a circumferential direction of the tire;
    the protective reinforcement being radially on an outside of a working reinforcement;
    the working reinforcement comprising at least two radially superposed working layers made up of reinforcers having a zigzag path in the circumferential direction of the tire;
    wherein the protective reinforcement has a mean radial thickness T at least equal to two times the diameter D of a said reinforcer, wherein the protective reinforcement comprises respectively on its radially interior face and on its radially exterior face parts of elastomeric compound having an axial width W at least equal to the diameter D of a said reinforcer,
    wherein the radially interior face of the protective reinforcement is an innermost layer of the reinforcers and the radially exterior face of the protective reinforcement is an outermost layer of the reinforcers,
    wherein the path in the circumferential direction of the tire of any said reinforcer of the protective reinforcement, in the circumferential direction of the tire, varies radially between the radially interior first face and the radially exterior second face, in such a way that the set of paths of said reinforcers of the protective reinforcement constitutes a three-dimensional lattice and wherein the path in the circumferential direction of the tire of any said reinforcer of the protective reinforcement, in the circumferential direction of the tire, is a zigzag curve extending axially over the axial width L of the protective reinforcement.

2. The aircraft tire according to claim 1, wherein the protective reinforcement has a mean radial thickness T at most equal to five times the diameter D of a said reinforcer.

3. The aircraft tire according to claim 1, wherein the axial width W of the parts made of elastomeric compound, comprised respectively on the radially interior face and on the radially exterior face of the protective reinforcement, is at most equal to ten times the diameter D of a said reinforcer.

4. The aircraft tire according to claim 1, wherein in any meridian plane, a ratio R, between a sum of the axial widths W of the parts made of elastomeric compound, comprised respectively on the radially interior face and on the radially exterior face of the protective reinforcement, and the axial width L of the protective reinforcement, is at least equal to 0.08.

5. The aircraft tire according to claim 1, wherein in any meridian plane, a ratio R, between a sum of the axial widths W of the parts made of elastomeric compound, comprised respectively on the radially interior face and on the radially exterior face of the protective reinforcement, and the axial width L of the protective reinforcement, is at most equal to 0.20.

6. The aircraft tire according to claim 1, wherein the reinforcers of the protective reinforcement are grouped into strips, comprising at least two consecutive reinforcers and having an axial width B.

7. The aircraft tire according to claim 6, wherein an axial spacing P1 between two consecutive said strips of said reinforcers each having a path, in the circumferential direction of the tire, that follows a zigzag curve is at least equal to 0.5 times the axial width B of a said strip and at most equal to five times the axial width B of a said strip.

8. The aircraft tire according to claim 1, wherein the path of any said reinforcer, in the circumferential direction of the tire, is a periodic zigzag curve having an amplitude A equal to the axial width L of the protective reinforcement and having a period $P=2\Pi R1/K$, K being a non-integer number in a range ]N, N+1[ where N is an integer at least equal to 0 and at most equal to 9, and R1 being a radius of the radially interior first face.

9. The aircraft tire according to claim 1, wherein the reinforcers of the protective reinforcement are made of at least one textile material.

10. The aircraft tire according to claim 1, wherein the reinforcers of the protective reinforcement are made of an aliphatic polyamide or of an aromatic polyamide or of a combination of an aliphatic polyamide and of an aromatic polyamide.

11. The aircraft tire according to claim 1, wherein the axial width W of the parts made of elastomeric compound, comprised respectively on the radially interior face and on the radially exterior face of the protective reinforcement, is at most equal to five times the diameter D of a said reinforcer.

12. The aircraft tire according to claim 1, wherein, in any meridian plane, a ratio R, between a sum of the axial widths W of the parts made of elastomeric compound, comprised respectively on the radially interior face and on the radially exterior face of the protective reinforcement, and the axial width L of the protective reinforcement, is at least equal to 0.10.

13. The aircraft tire according to claim 12, wherein, in any meridian plane, the ratio R, between the sum of the axial widths W of the parts made of elastomeric compound, comprised respectively on the radially interior face and on the radially exterior face of the protective reinforcement, and the axial width L of the protective reinforcement, is at most equal to 0.15.

14. The aircraft tire according to claim 1, wherein the path of any said reinforcer, in the circumferential direction of the tire, is a periodic zigzag curve having an amplitude A equal to the axial width L of the protective reinforcement and having a period $P=2\Pi R1/K$, K being a non-integer number in a range ]N, N+1[ where N is an integer at least equal to 0 and at most equal to 4, and R1 being a radius of the radially interior first face.

* * * * *